US012786108B2

(12) United States Patent
Baudin et al.

(10) Patent No.: US 12,786,108 B2
(45) Date of Patent: Nov. 3, 2026

(54) PROPAGATING LINK AGGREGATION CONTROL PROTOCOL STATUS TO SINGLE ROOT INPUT/OUTPUT VIRTUALIZATION VIRTUAL FUNCTION STATUS

(71) Applicant: Red Hat, Inc., Raleigh, NC (US)

(72) Inventors: Franck Baudin, Puteaux (FR); Carlos Goncalves, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 40 days.

(21) Appl. No.: 18/958,086

(22) Filed: Nov. 25, 2024

(65) Prior Publication Data

US 2026/0149657 A1 May 28, 2026

(51) Int. Cl.
*H04L 45/24* (2022.01)
*H04L 45/00* (2022.01)
*H04L 45/28* (2022.01)

(52) U.S. Cl.
CPC ............ *H04L 45/245* (2013.01); *H04L 45/22* (2013.01); *H04L 45/28* (2013.01)

(58) Field of Classification Search
CPC ........ H04L 45/245; H04L 45/22; H04L 45/28
See application file for complete search history.

(56) References Cited

U.S. PATENT DOCUMENTS 10,992,515 B1 * 4/2021 Ranjit ..................... H04L 41/06
2017/0346680 A1 * 11/2017 Ma ...................... G06F 9/45558
2021/0006511 A1 * 1/2021 Uminski ........... G06F 15/17331

* cited by examiner

*Primary Examiner* — Shirley X Zhang
(74) *Attorney, Agent, or Firm* — Womble Bond Dickinson (US) LLP

(57) ABSTRACT

A system and method of propagating link aggregation control protocol status to single root input/output virtualization virtual function status. The method includes obtaining, by a processing device and using a relay agent executing on the processing device, state information from a Link Aggregation Control Protocol (LACP) speaker of a host machine. The method includes detecting, based on the state information, a communication failure between a physical function (PF) of a network adapter of a host machine and a first network switch of a plurality of network switches. The method includes identifying one or more computing environments that are communicatively coupled to the first network switch through a first virtual function (VF) associated with the PF. The method includes notifying the one or more computing environments about the communication failure by modifying a link state of the first VF.

20 Claims, 6 Drawing Sheets

PROPAGATING LINK AGGREGATION CONTROL PROTOCOL STATUS TO SINGLE ROOT INPUT/OUTPUT VIRTUALIZATION VIRTUAL FUNCTION STATUS

TECHNICAL FIELD

The present disclosure relates generally to software technology, and more particularly, to systems and methods of propagating link aggregation control protocol status to single root input/output virtualization virtual function status.

BACKGROUND

Link Aggregation Control Protocol (LACP) is a standardized protocol defined by Institute of Electrical and Electronics Engineers (IEEE) 802.3ad that allows multiple physical network links to be combined into a single logical link, known as a Link Aggregation Group (LAG) or EtherChannel. This aggregation enhances bandwidth utilization and provides redundancy, improving network resilience by distributing traffic across multiple links. LACP dynamically manages these links, adjusting to network conditions to ensure optimal performance and load balancing. It operates in two modes: active, where it initiates negotiations, and passive, where it responds to LACP packets.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
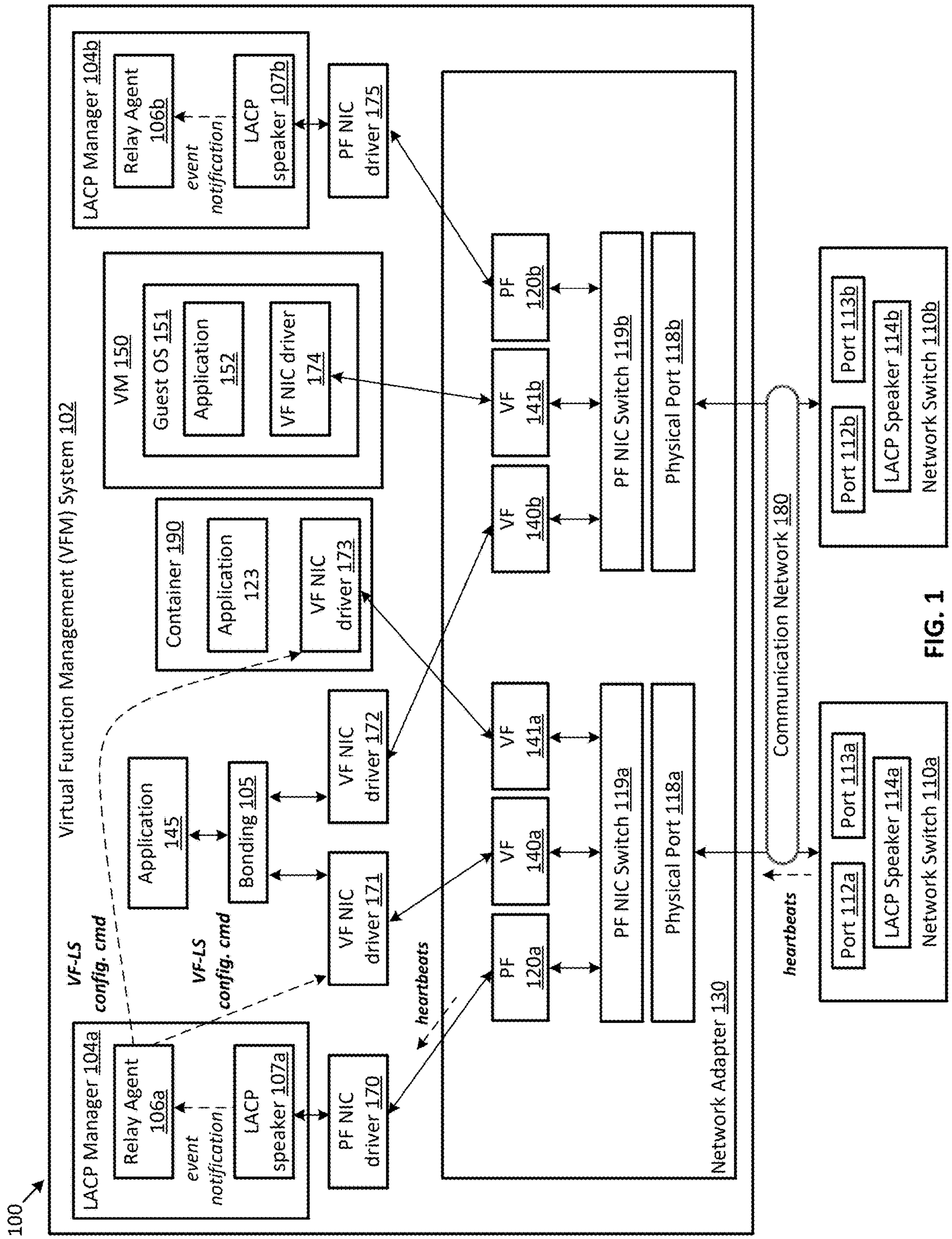
FIG. 1 is a block diagram depicting an example environment for propagating link aggregation control protocol status to single root input/output virtualization virtual function status, according to some embodiments.

Applications such as Virtual Network Functions (VNFs) and Container Network Functions (CNFs) demand high-speed data rates and high availability to fulfill their diverse network service requirements. To achieve this, they frequently utilize a link aggregation (LAG, also known as bonding or trunking) device with two attached Virtual Functions (VFs) originating from distinct Physical Functions (PFs). These PFs are connected to the same or different network devices (switch, router, server, etc.), providing redundant network paths for load balancing and fault tolerance.

However, this approach is vulnerable to switch failures that do not bring down the link carrier. For instance, if a switch crashes, the link status of the VFs remains up, but network connectivity is lost. Applications relying on this link will continue to attempt to send/receive data, leading to packet loss (silently blackholed traffic), performance degradation, and a waste of computing and/or network resources. Thus, there is a long-felt but unsolved need to solve the problems of addressing the challenge of efficiently managing LACP communication.

Aspects of the present disclosure address the above-noted and other deficiencies by providing a virtual function management (VFM) system that performs a method to detect link data malfunctions. The VFM system leverages the LACP established between a physical function (PF) executing on the VFM system and its peer device (e.g. switch, router, server). The LACP protocol supports only one LACP aggregation per link, meaning per PF, and without the VFM system, only the PF had a view of the LACP aggregation status, not the VFs. By monitoring LACP state changes on the PF, the VFRM system can proactively determine the availability of the network path and update the state of the corresponding VF accordingly. This ensures that applications are aware of switch failures and can take appropriate actions, such as rerouting traffic or triggering failover mechanisms.

The proposed method utilizes an LACP status propagation relay agent that is configured to intercept LACP state updates from the PF and modify the VF state accordingly. In particular, if LACP is not converged on the PF, the relay sets the VF state to OFF (e.g., disabled), which prevents the VF from sending or receiving traffic. Once LACP convergence is restored, the relay updates the VF state back to AUTO (e.g., enabled), which enables normal network operation.

The proposed method provides several benefits for applications:

Enhanced availability: By proactively detecting switch failures, the method ensures that applications are not susceptible to packet loss and performance degradation due to undetected network outages.

Simplified network management: The method simplifies network management by automating the process of updating VF states based on LACP status changes.

Wide applicability: The method is compatible with various Virtual Network Function (VNF) and Cloud-Native Network Function (CNF) environments and can be deployed across different network architectures and cloud environments.

In an illustrative embodiment, a VFM system obtains, using a relay agent executing on the VFM system, state information from a Link Aggregation Control Protocol (LACP) speaker of a host machine. The VFM detects, based on the state information, a communication failure between a physical function (PF) of a network adapter of a host machine and a first network switch of a plurality of network switches. The VFM identifies one or more computing environments that are communicatively coupled to the first network switch through a first VF associated with the PF. The VFM notifies the one or more computing environments about the communication failure by modifying a link state of the first VF.

FIG. 1 is a block diagram depicting an example environment for propagating link aggregation control protocol status to single root input/output virtualization virtual function status, according to some embodiments. The environment 100 includes a virtual function management (VFM) system 102 and network switches 110 (e.g., network switch 110*a*, network switch 110*b*) that are each coupled together through a communication network 180.

The VFM system 102 includes a network adapter 130 that includes physical function network interface card (PF NIC) switches 119 (e.g., PF NIC switches 119*a*, 119*b*). The VFM system 102 includes physical ports 118 (e.g., physical ports 118*a*, 118*b*). The VFM system 102 includes PFs 120 (e.g., PFs 120*a*, 120*b*). The VFM system 102 includes VFs 140 (e.g., VFs 140*a*, 140*b*) and VFs 141 (e.g., VFs 141*a*, 141*b*).

The VFM system 102 includes and/or executes LACP managers 104 (e.g., LACP managers 104*a*, 104*b*). The VFM system 102 includes and/or executes an application 145 and a bonding device 105. The VFM system 102 includes and/or executes a container 190, which in turn, includes and/or executes an application 123 and a VF NIC driver 173. The VFM system 102 includes a virtual machine (VM) 150 that executes a guest operating system, which in turn, includes and/or executes an application 152 and a VF NIC driver 174.

The VFM system 102 includes PF NIC driver 170 that communicatively couples the LACP speaker 107*a* and the PF 120*a*. The VFM system 102 includes VF NIC driver 171 that communicatively couples the relay agent 106*a* to the VF 140*a* and the VF NIC driver 173. The container 190 includes a VF NIC driver 173 that communicatively couples the application 123 of the container 190 and the VF 141*a*. The VM 150 includes a VF NIC driver 174 that communicatively couples the application 152 of the guest OS 151 and the VF 141*b*. The VFM system 102 includes a PF NIC driver 175 that communicatively couples the LACP speaker 107*b* of the LACP manager 104*b* and the PF 120*b*.

The PF 120*a*, VF 140*a*, and VF 141*a* are each communicatively coupled to the PF NIC switch 119*a*, which is communicatively coupled to physical port 118*a*, which in turn is communicatively coupled the network switch 110*a* via the communication network 180.

The PF 120*b*, VF 140*b*, and VF 141*b* are each communicatively coupled to the PF NIC switch 119*b*, which is communicatively coupled to physical port 118*b*, which in turn is communicatively coupled the network switch 110*b* via the communication network 180.

The network switches 110 includes ports 112 (e.g., ports 112*a*, 112*b*, 113*a*, 113*b*) and LACP speakers 114 (e.g., 114*a*, 114*b*). The LACP speaker 114 can periodically send heartbeat signals to the LACP speaker 107. For example, the LACP speaker 114 sends a heartbeat signal to the physical port 118*a* via one of its ports 112 and communication network 180. The physical port 118*a* forwards the heartbeat signal to the PF NIC switch 119*a*, which in turn, forwards the heartbeat signal, which in turn, forwards the heartbeat signal to the PF 120*a*, which in turn, forwards the heartbeat signal to the PF NIC driver 170, which in turn, forwards the heartbeat signal to the LACP speaker 107*a*.

An application (e.g., application 123, 145, 152) 110 may be any type of software operating system including, for example, Microsoft Windows®, macOS®, Linux®, Android®, VxWorks®, Quantux UNIX (QNX). In other embodiments, an application may be any type of software application that provides any type of service (e.g., a network service, a computing service, a security service, etc.) for the VFM system 102. For example, the application may be an antivirus application that protects the computing resources of the VFM system 102 from malicious activity, such as phishing attacks, viruses, malware, and ransomware. As another example, the application may be a navigation application that provides navigation services (e.g., Global Positioning System (GPS) coordinates) for a vehicle.

The VFM system 102 may be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

Still referring to FIG. 1, the relay agent 106*a* obtains state information from the LACP speaker 107*a*. The relay agent 106*a* detects, based on the state information, a communication failure between the PF 120*a* of the network adapter 130 and network switch 110*a*. The relay agent 106 identifies one or more computing environments (e.g., application 145) that are communicatively coupled to the network switch 110*a* through VF 140*a* that is associated with the PF 120*a*. The relay agent 106*a* notifies the one or more computing environments (e.g., application 145) about the communication failure by modifying a link state of the VF 140*a*.

Although FIG. 1 shows only a select number of computing devices (e.g., VFM system 102, network switch 110*a*, network switch 110*b*, etc.), the environment 100 may include any number of computing devices, components, and databases that are interconnected in any arrangement to facilitate the exchange of data between the computing devices.

Figure 2:
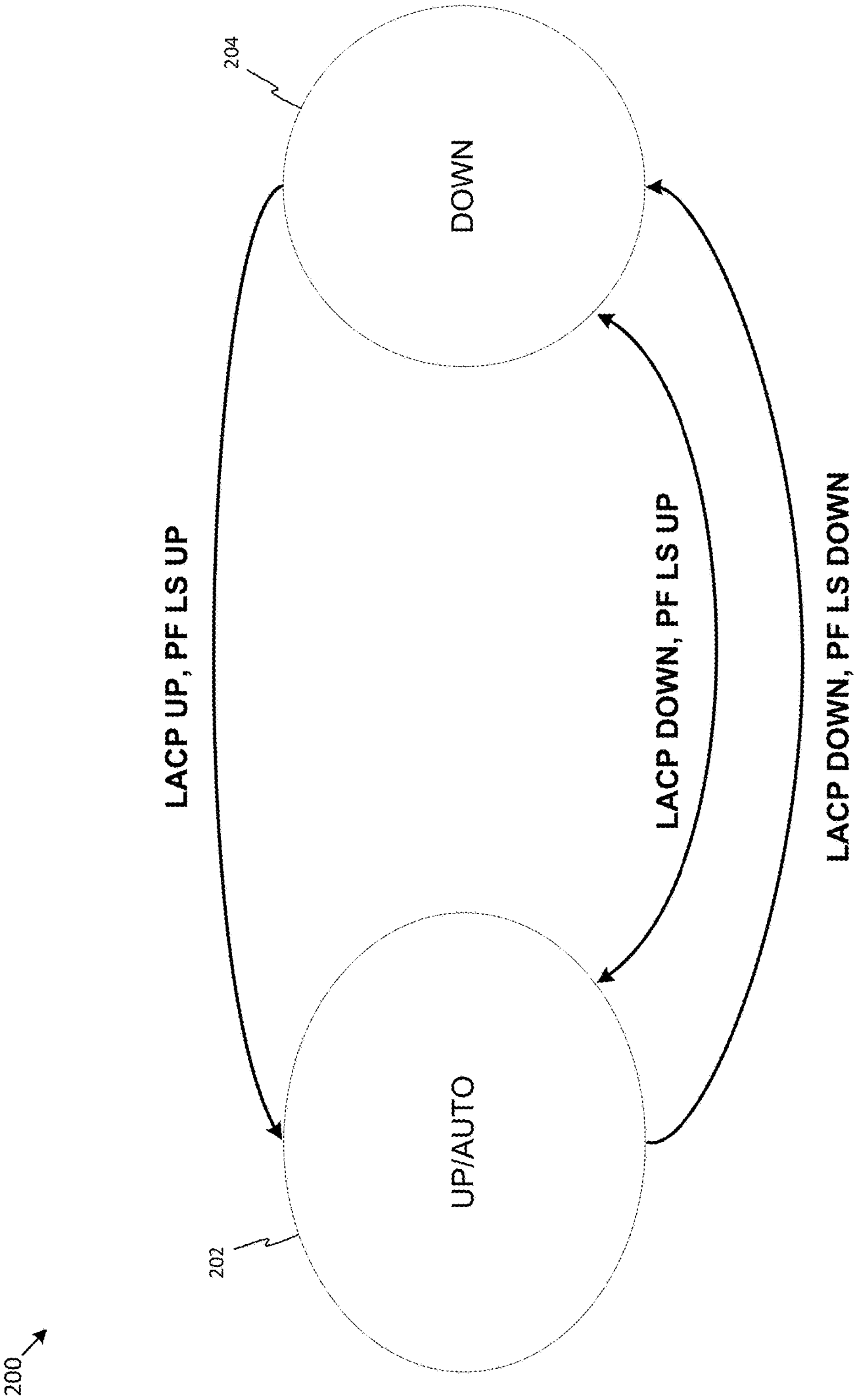
FIG. 2 is a block diagram depicting an example state machine for managing the aggregation of multiple physical links into a single logical link, according to some embodiments.

FIG. 2 is a block diagram depicting an example state machine for managing the aggregation of multiple physical links into a single logical link, according to some embodiments. The LACP state machine 200 is responsible for performing various tasks including, handling the reception of LACP Data Units (LACPDUs) and updates the state of the link based on the received information, managing the transmission of LACPDUs to inform the partner device about the current state and configuration of the link, and controlling the aggregation and distribution of data across the aggregated links to ensure that data is properly managed and transmitted. As shown, the LACP state machine 200 toggles between a first VF state 202 (up/auto) and a second VF state 204 (down).

Understanding what link carrier is particularly important to understand its shortcomings. In the Linux kernel, the term "link carrier" refers to the physical state of a network connection. It indicates whether the physical layer (PHY) of the network interface card (NIC) detects a signal on the network cable or medium (e.g., fiber optic cable).

A link refers to the physical connection between two network devices, such as an Ethernet cable connecting a computer to a router/switch/computer. A carrier signifies the presence of a signal on the link, indicating potential for data transmission.

Therefore, "link carrier" essentially tells if the network cable is plugged in and functioning at the physical level (as opposed to data link, an upper layer in the stack). While the most common values for link carrier are indeed 1 (up) and 0 (down), there can also be an additional value of 2 (auto) in some cases. The "auto" value for link carrier signifies that the network interface is configured to negotiate the carrier state automatically. This means the NIC driver will attempt to dynamically determine the appropriate link speed and duplex mode (full or half duplex) based on negotiation with the connected device. Negotiation typically happens through protocols like Ethernet auto-negotiation.

Possible link carrier values may be as follows: 1 (up): Carrier signal present, network interface operational; 0 (down): Carrier signal absent, network interface not functioning; or 2 (auto): Link speed and duplex mode are automatically negotiated.

The availability and usage of the "auto" value might vary depending on the specific network interface and its driver configuration. Some network interfaces may not support automatic negotiation, and in those cases, the link carrier value is 1 or 0 based on the physical connection state.

The relay agent 106*a* is configured to intercept LACP state updates from the PF and modify the VF state that is maintained by the LACP state machine 200. In particular, if LACP is not converged on the PF, the relay agent 1106*a* sets the VF state to the second VF state 204 (down, off, disabled), which prevents the corresponding VF from sending or receiving traffic. Once LACP convergence is restored, the relay agent 106*a* updates the VF state back to the first VF state (up/auto, on, enabled), which enables normal network operation.

Figure 3A:
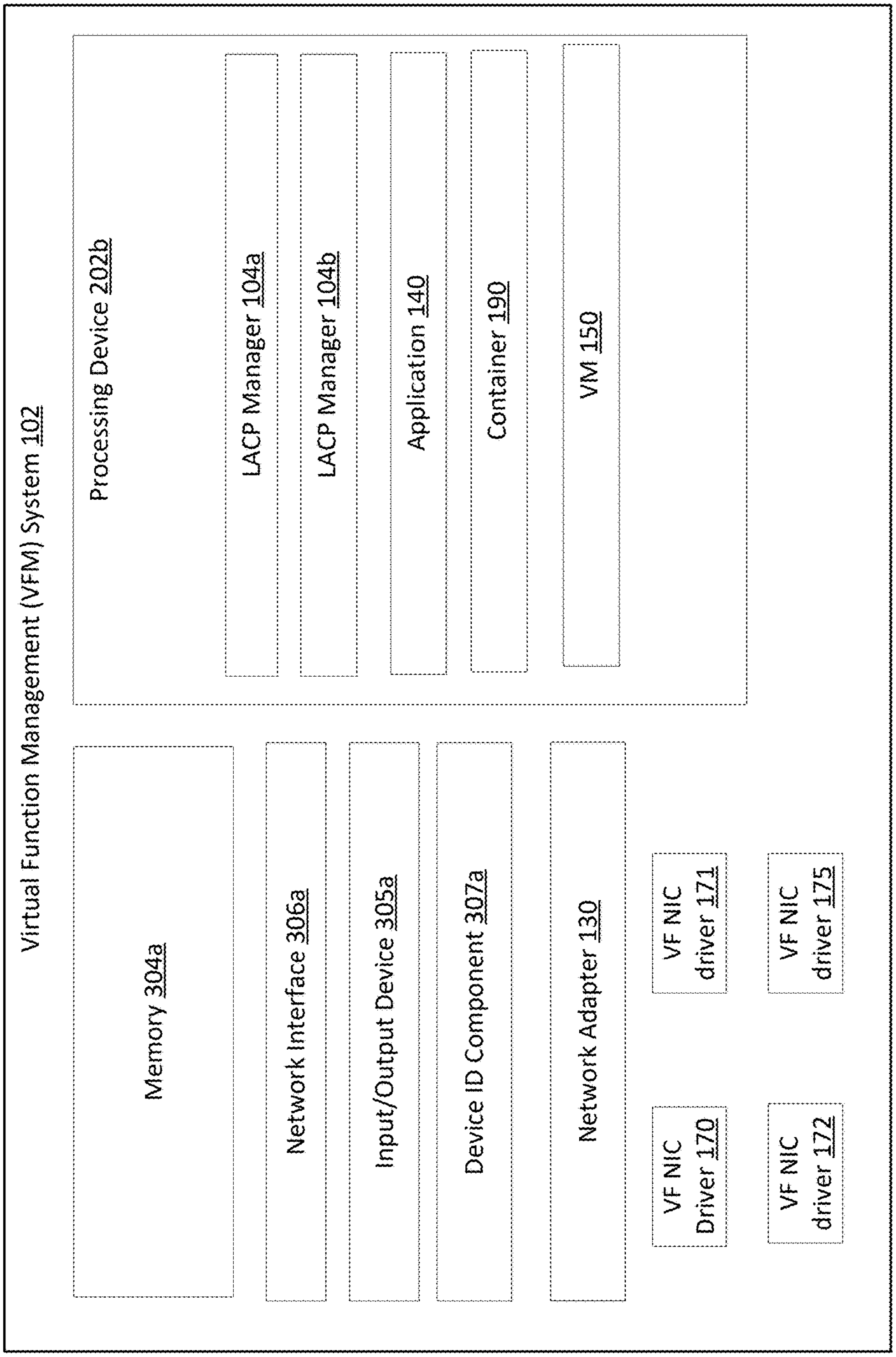
FIG. 3A is a block diagram depicting an example of the Virtual Function Management (VFM) system in FIG. 1, according to some embodiments.

FIG. 3A is a block diagram depicting an example of the VFM system 102 in FIG. 1, according to some embodiments. While various devices, interfaces, and logic with particular functionality are shown, it should be understood that the VFM system 102 may include any number of devices and/or components, interfaces, and logic for facilitating the functions described herein. For example, the activities of multiple devices may be combined as a single device and implemented on a same processing device (e.g., processing device 202*a*), as additional devices and/or components with additional functionality are included.

The VFM system 102 includes a processing device 202*a* (e.g., general purpose processor, a PLD, etc.), which may be composed of one or more processors, and a memory 204*a* (e.g., synchronous dynamic random-access memory (DRAM), read-only memory (ROM)), which may communicate with each other via a bus (not shown).

The processing device 202*a* may be provided by one or more general-purpose processing devices such as a microprocessor, central processing unit, or the like. In some embodiments, processing device 202*a* may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202*a* may include one or more special-purpose processing devices such as an application specific integrated circuit (ASIC), a field programmable gate array (FPGA), a digital signal processor (DSP), network processor, or the like. The processing device 202*a* may be configured to execute the operations described herein, in accordance with one or more aspects of the present disclosure, for performing the operations and steps discussed herein.

The memory 204*a* (e.g., Random Access Memory (RAM), Read-Only Memory (ROM), Non-volatile RAM (NVRAM), Flash Memory, hard disk storage, optical media, etc.) of processing device 202*a* stores data and/or computer instructions/code for facilitating at least some of the various processes described herein. The memory 204*a* includes tangible, non-transient volatile memory, or non-volatile memory. The memory 204*a* stores programming logic (e.g., instructions/code) that, when executed by the processing device 202*a*, controls the operations of the VFM system 102. In some embodiments, the processing device 202*a* and the memory 204*a* form various processing devices and/or circuits described with respect to the VFM system 102. The instructions include code from any suitable computer programming language such as, but not limited to, C, C++, C #, Java, JavaScript, VBScript, Perl, HTML, XML, Python, TCL, and Basic.

The VFM system 102 includes a network adapter 130, which in some embodiments, may be physically separate from the VFM system 102. The VFM system 102 includes PF NIC drivers 170, 171, 172, and 175.

The processing device 202*a* executes LACP manager 104*a*, LACP manager 104*b*, application 145, container 190, and VM 150.

The LACP manager 104*a* may obtain, using the relay agent 106*a*, state information from a Link Aggregation Control Protocol (LACP) speaker of a host machine. The state information indicates a state change from a first LACP state (e.g., up/auto) to a second LACP state (e.g., down).

The LACP manager 104*a* may detect, based on the state information, a communication failure between a PF (e.g., PF 120*a*) of the network adapter 130 and a first network switch (e.g., network switch 110*a*) of a plurality of network switches. In some embodiments, the communication failure may be attributed to a failure of the PF 120*a*, the PF NIC switch 119*a*, the physical port 118*a*, the network switch 110*a*, a link between the PF 120*a* and the PF NIC switch 119*a*, and/or a link between the physical port 118*a* and the network switch 110*a*.

The LACP manager 104*a* may identify one or more computing environments (e.g., application 145, container 190, VM 150) that are communicatively coupled to the first network switch (e.g., network switch 110*a*) through a first VF (e.g., VF 140*a*) associated with the PF 120*a*. The LACP manager 104*a* notifies the one or more computing environments about the communication failure by modifying a link state of the first VF.

In some embodiments, LACP manager 104*a* notifies the one or more computing environments about the communication failure by disallowing (e.g., preventing) the first VF to communicate with the first network switch by setting a link state of the first VF into a first link state (e.g., down).

In some embodiments, setting the link state of the first VF into the first link state further causes a first computing environment (e.g., application 145, container 190, or VM 150) to stop communicating with the first network switch via the first VF.

In some embodiments, setting the link state of the first VF into the first link state further causes the first computing environment to begin communicating with a second network switch (e.g., network switch 110*b*).

In some embodiments, a second computing environment (e.g., application 145, container 190, or VM 150) communicates with the first network switch via a second VF (e.g., VF 141*a*) that is associated with the PF 120*a* while the link state of the first VF is set in the first link state.

The LACP manager 104*a* may determine that the communication failure no longer exists. In response, the LACP manager 104*a* may allow the first VF to communicate with the first network switch by changing the link state of the first VF from the first link state into a second VF state.

The LACP manager 104*a* may obtain the state information by periodically poll the LACP speaker of the host machine for the state information.

The LACP speaker 107*a* of the LACP manager 104*a* may determine an absence of a communication from the PF 120*a* of the network adapter 130 during a particular timeframe (e.g., 1 minute, 1 hour). The LACP speaker 107*a* may provide the state information to the relay agent 106*a* of the LACP manager 104*a* responsive to determining the absence of the communication from the PF 120*a* of the network adapter 130 during the particular timeframe.

The VFM system 102 includes a network interface 306*a* configured to establish a communication session with a computing device for sending and receiving data over a communication network to the computing device. Accordingly, the network interface 306*a* includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the VFM system 102 includes a plurality of network interfaces 306*a* of different types, allowing for connections to a variety of networks, such as local area networks (public or private) or wide area networks including the Internet, via different sub-networks.

The VFM system 102 includes an input/output device 305*a* configured to receive user input from and provide information to a user. In this regard, the input/output device 305*a* is structured to exchange data, communications, instructions, etc. with an input/output component of the VFM system 102. Accordingly, input/output device 305*a* may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the VFM system 102, such as a built-in display, touch screen, microphone, etc., or external to the housing of the VFM system 102, such as a monitor connected to the VFM system 102, a speaker connected to the VFM system 102, etc., according to various embodiments. In some embodiments, the VFM system 102 includes communication circuitry for facilitating the exchange of data, values, messages, and the like between the input/output device 305*a* and the components of the VFM system 102. In some embodiments, the input/output device 305*a* includes machine-readable media for facilitating the exchange of information between the input/output device 305*a* and the components of the VFM system 102. In still another embodiment, the input/output device 305*a* includes any combination of hardware components (e.g., a touchscreen), communication circuitry, and machine-readable media.

The VFM system 102 includes a device identification component 307*a* (shown in FIG. 2A as device ID component 307*a*) configured to generate and/or manage a device identifier associated with the VFM system 102. The device identifier may include any type and form of identification used to distinguish the VFM system 102 from other computing devices. In some embodiments, to preserve privacy, the device identifier may be cryptographically generated, encrypted, or otherwise obfuscated by any device and/or component of VFM system 102. In some embodiments, the VFM system 102 may include the device identifier in any communication (e.g., public encrypted message, private encrypted message, etc.) that the VFM system 102 sends to a computing device.

The VFM system 102 includes a bus (not shown), such as an address/data bus or other communication mechanism for communicating information, which interconnects the devices and/or components of VFM system 102, such as processing device 202*a*, network interface 306*a*, input/output device 305*a*, and/or device ID component 307*a*.

In some embodiments, some or all the devices and/or components of VFM system 102 may be implemented with the processing device 202*a*. For example, the VFM system 102 may be implemented as a software application stored within the memory 204*a* and executed by the processing device 202*a*. Accordingly, such embodiment can be implemented with minimal or no additional hardware costs. In some embodiments, any of these above-recited devices and/or components rely on dedicated hardware specifically configured for performing operations of the devices and/or components.

Figure 3B:
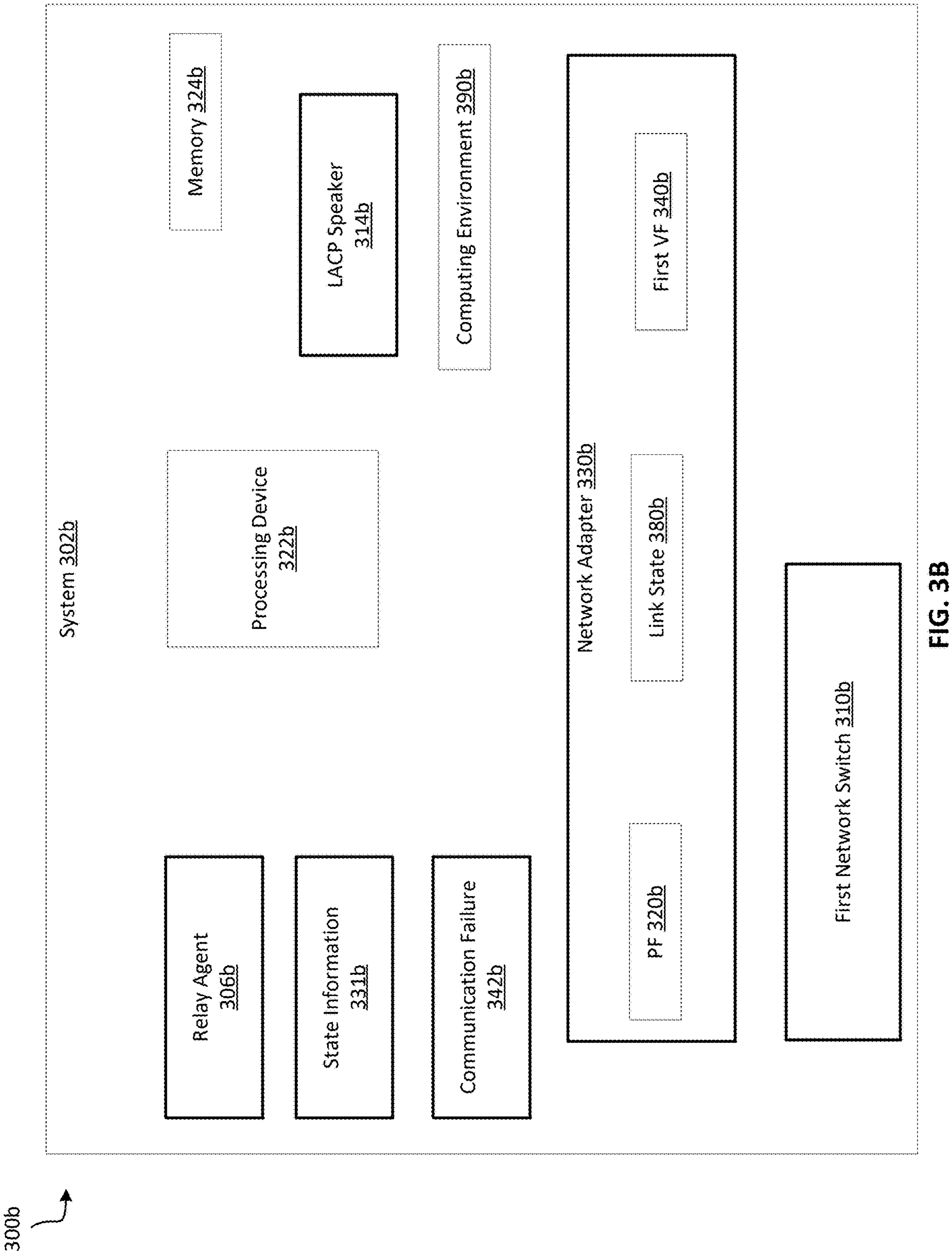
FIG. 3B is a block diagram depicting an example environment of a system to propagate link aggregation control protocol status to single root input/output virtualization virtual function status, according to some embodiments.

FIG. 3B is a block diagram depicting an example environment of a system to propagate link aggregation control protocol status to single root input/output virtualization virtual function status, according to some embodiments. A system 302*b* (e.g., VFM system 102 in FIG. 2A) includes a processing device 322*b* and memory 324*b* coupled to the processing device 322*b*. The processing device 322 obtains, using a relay agent 306*b* executing on the processing device 322*b*, state information 331*b* from a LACP speaker 314*b* of a host machine (e.g., VFM system 102 in FIG. 3A). The processing device 322 detects, based on the state information 331*b*, a communication failure 342*b* between a PF 320*b* of a network adapter 330*b* of the host machine and a first network switch 310*b* of a plurality of network switches. The processing device 322 identifies one or more computing environments 390*b* that are communicatively coupled to the first network switch 310*b* through a first VF 340*b* associated with the PF 320*b*. The processing device 322*b* notifies the one or more computing environments 390*b* about the communication failure 342*b* by modifying a link state 380*b* of the first VF 340*b*.

Figure 4:
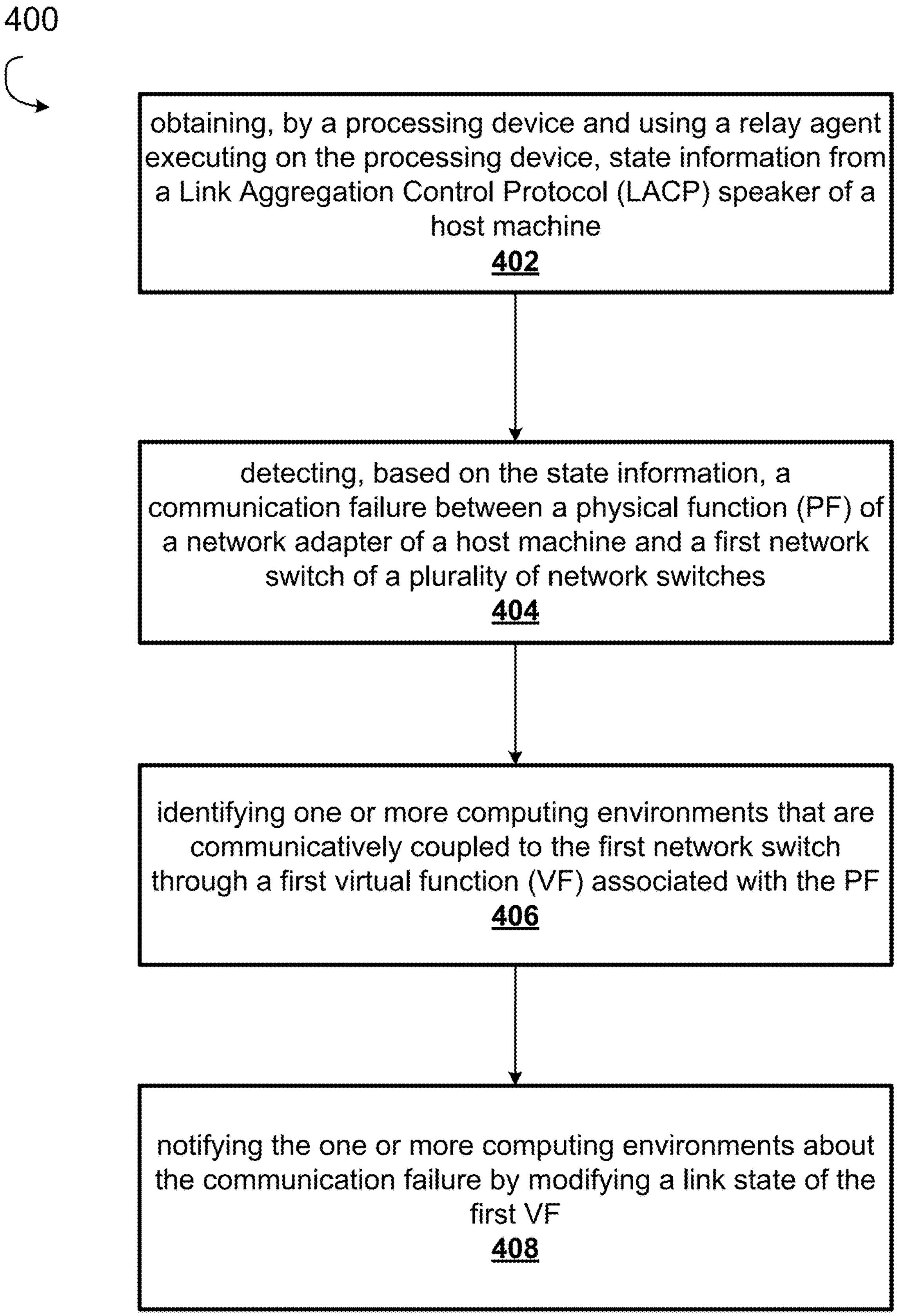
FIG. 4 is a flow diagram depicting a method of propagating link aggregation control protocol status to single root input/output virtualization virtual function status, according to some embodiments.

FIG. 4 is a flow diagram depicting a method of propagating link aggregation control protocol status to single root input/output virtualization virtual function status, according to some embodiments. Method 400 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 400 may be performed by a VFM system, such as VFM system 102 in FIG. 1.

With reference to FIG. 4, method 400 illustrates example functions used by various embodiments. Although specific function blocks ("blocks") are disclosed in method 300, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of obtaining, by a processing device and using a relay agent executing on the processing device, state information from a Link Aggregation Control Protocol (LACP) speaker of a host machine. The method 400 includes the block 404 of detecting, based on the state information, a communication failure between a physical function (PF) of a network adapter of a host machine and a first network switch of a plurality of network switches. The method 400 includes the block 406 of identifying one or more computing environments that are communicatively coupled to the first network switch through a first virtual function (VF) associated with the PF. The method of 400 includes the block 408 of notifying the one or more computing environments about the communication failure by modifying a link state of the first VF.

Figure 5:
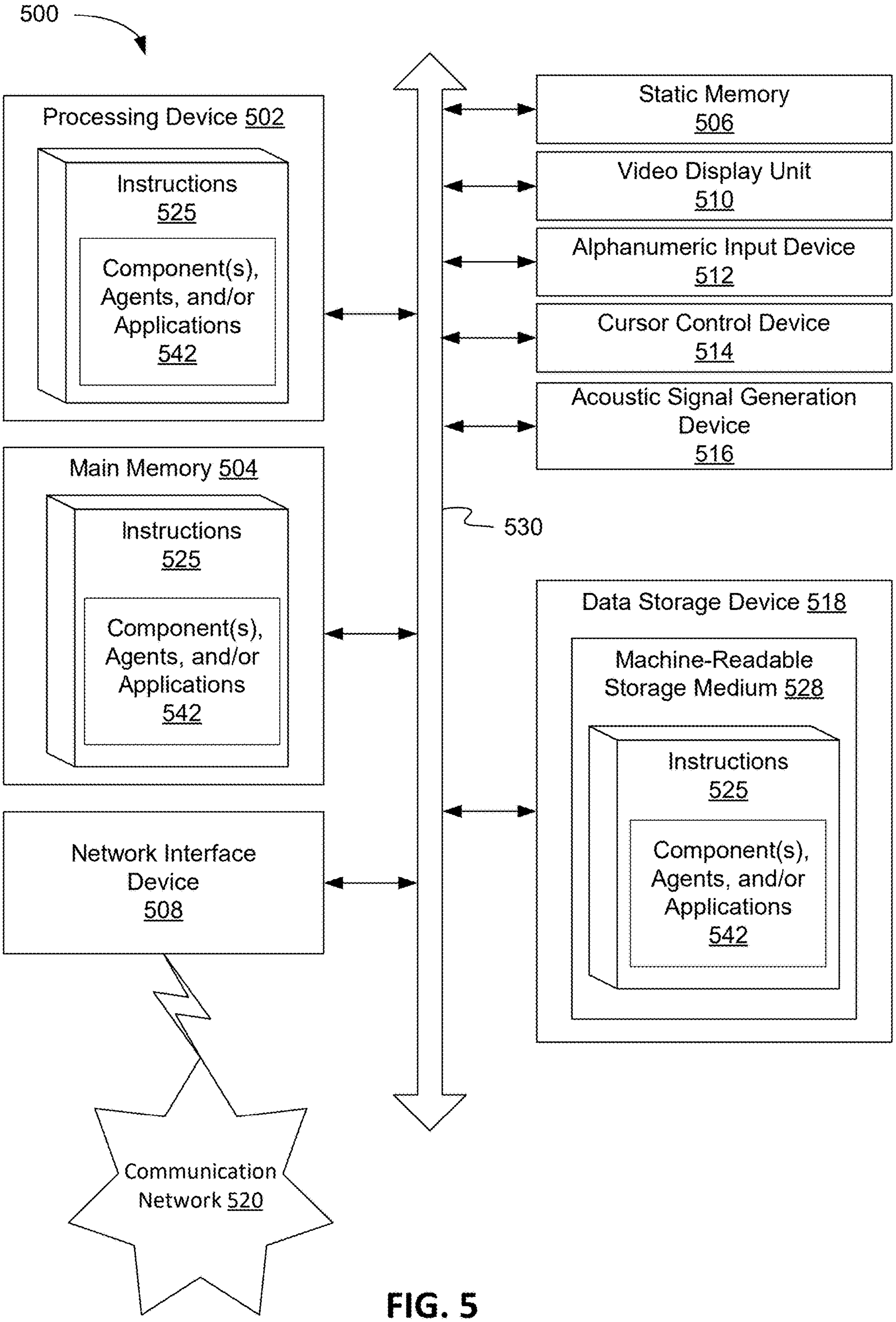
FIG. 5 is a block diagram of an example computing device that may perform one or more of the operations described herein, in accordance with some embodiments.

FIG. 5 is a block diagram of an example computing device that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general-purpose processor, a PLD, etc.) 502, a main memory 504 (e.g., synchronous dynamic random-access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components, agents, and/or applications 542 (e.g., LACP manager 104*a*, LACP manager 104*b*, application 145, bonding device 105, container 190, VM 150 in FIG. 1) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "obtaining", "detecting", "identifying", "notifying", "disallowing", "setting", "determining", "polling", "providing", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

obtaining, by a processing device and using a relay agent executing on the processing device, state information from a Link Aggregation Control Protocol (LACP) speaker of a host machine;

detecting, based on the state information, a communication failure between a physical function (PF) of a network adapter of the host machine and a first network switch of a plurality of network switches, wherein detecting the communication failure comprises determining that the state information indicates that an LACP aggregation associated with the PF is not converged and determining that a physical link carrier state of a physical port associated with the PF indicates that a physical link signal is present;

identifying one or more computing environments that are communicatively coupled to the first network switch through a first virtual function (VF) associated with the PF; and notifying the one or more computing environments about the communication failure by modifying a link state of the first VF.

2. The method of claim 1, wherein notifying the one or more computing environments about the communication failure further comprises:

disallowing the first VF to communicate with the first network switch by setting a link state of the first VF into a first link state.

3. The method of claim 2, wherein setting the link state of the first VF into the first link state further causes a first computing environment of the one or more computing environments to stop communicating with the first network switch via the first VF.

4. The method of claim 3, wherein setting the link state of the first VF into the first link state further causes the first computing environment to begin communicating with a second network switch of the plurality of network switches.

5. The method of claim 3, wherein a second computing environment of the one or more computing environments communicates with the first network switch via a second VF associated with the PF while the link state of the first VF is set in the first link state.

6. The method of claim 2, further comprising:

determining that the communication failure no longer exists; and allowing the first VF to communicate with the first network switch by changing the link state of the first VF from the first link state into a second VF state.

7. The method of claim 1, wherein the state information indicates a state change from a first LACP state to a second LACP state.

8. The method of claim 1, wherein obtaining the state information comprises:

periodically polling the LACP speaker of the host machine for the state information.

9. The method of claim 1, further comprising:

determining, by the LACP speaker, an absence of a communication from the PF of the network adapter during a particular timeframe; and providing, by the LACP speaker, the state information to the relay agent responsive to determining the absence of the communication from the PF of the network adapter during the particular timeframe.

10. The method of claim 1, wherein the one or more computing environments comprise at least one of a container, a virtual machine, or an application.

11. A system comprising:

a memory; and a processing device, operatively coupled to the memory, to:

obtain, using a relay agent executing on the processing device, state information from a Link Aggregation Control Protocol (LACP) speaker of a host machine;

detect, based on the state information, a communication failure between a physical function (PF) of a network adapter of the host machine and a first network switch of a plurality of network switches, wherein detecting the communication failure comprises determining that the state information indicates that an LACP aggregation associated with the PF is not converged and determining that a physical link carrier state of a physical port associated with the PF indicates that a physical link signal is present;

identify one or more computing environments that are communicatively coupled to the first network switch through a first virtual function (VF) associated with the PF; and notify the one or more computing environments about the communication failure by modifying a link state of the first VF.

12. The system of claim 11, wherein to notify the one or more computing environments about the communication failure, the processing device is further to:

disallow the first VF to communicate with the first network switch by setting a link state of the first VF into a first link state.

13. The system of claim 12, wherein to set the link state of the first VF into the first link state further causes a first computing environment of the one or more computing environments to stop communicating with the first network switch via the first VF.

14. The system of claim 13, wherein to set the link state of the first VF into the first link state further causes the first computing environment to begin communicating with a second network switch of the plurality of network switches.

15. The system of claim 13, wherein a second computing environment of the one or more computing environments communicates with the first network switch via a second VF associated with the PF while the link state of the first VF is set in the first link state.

16. The system of claim 12, wherein the processing device is to:

determine that the communication failure no longer exists; and allow the first VF to communicate with the first network switch by changing the link state of the first VF from the first link state into a second VF state.

17. The system of claim 11, wherein the state information indicates a state change from a first LACP state to a second LACP state.

18. The system of claim 11, wherein to obtain the state information, the processing device is to:

periodically poll the LACP speaker of the host machine for the state information.

19. The system of claim 11, wherein the processing device is to:

determine, by the LACP speaker, an absence of a communication from the PF of the network adapter during a particular timeframe; and provide, by the LACP speaker, the state information to the relay agent responsive to determining the absence of the communication from the PF of the network adapter during the particular timeframe.

20. A non-transitory computer-readable medium storing instructions that, when executed by a processing device, cause the processing device to:

obtain, by the processing device and using a relay agent executing on the processing device, state information from a Link Aggregation Control Protocol (LACP) speaker of a host machine;

detect, based on the state information, a communication failure between a physical function (PF) of a network adapter of the host machine and a first network switch of a plurality of network switches, wherein detecting the communication failure comprises determining that the state information indicates that an LACP aggregation associated with the PF is not converged and determining that a physical link carrier state of a physical port associated with the PF indicates that a physical link signal is present;

identify one or more computing environments that are communicatively coupled to the first network switch through a first virtual function (VF) associated with the PF; and notify the one or more computing environments about the communication failure by modifying a link state of the first VF.

* * * * *